United States Patent
Finegold et al.

(10) Patent No.: US 10,719,785 B2
(45) Date of Patent: Jul. 21, 2020

(54) SYSTEM FOR IMPROVED VEHICLE LATE RETURN PREDICTION AND DETECTION

(71) Applicant: Zipcar Inc., Cambridge, MA (US)

(72) Inventors: Rafi Finegold, Sharon, MA (US); Jonathan Wolfe, Cambridge, MA (US); Lesley Mottla, Rockport, MA (US)

(73) Assignee: ZIPCAR, INC., Boston, MA (US)

( * ) Notice: Subject to any disclaimer, the term of this patent is extended or adjusted under 35 U.S.C. 154(b) by 139 days.

(21) Appl. No.: 13/726,847

(22) Filed: Dec. 26, 2012

(65) Prior Publication Data
US 2013/0246102 A1    Sep. 19, 2013

Related U.S. Application Data

(60) Provisional application No. 61/610,031, filed on Mar. 13, 2012.

(51) Int. Cl.
G06Q 10/06 (2012.01)
G06Q 10/02 (2012.01)
G06Q 50/30 (2012.01)

(52) U.S. Cl.
CPC .......... *G06Q 10/02* (2013.01); *G06Q 10/025* (2013.01); *G06Q 50/30* (2013.01)

(58) Field of Classification Search
USPC .............. 702/188; 705/7.22, 7.23, 7.24, 7.25
See application file for complete search history.

(56) References Cited

U.S. PATENT DOCUMENTS

| | | | |
|---|---|---|---|
| 6,240,365 B1 | 5/2001 | Bunn | |
| 2001/0037174 A1* | 11/2001 | Dickerson | ...................... 701/200 |
| 2004/0010338 A1* | 1/2004 | Ogura | .................... G06Q 10/02 700/214 |
| 2004/0193440 A1 | 9/2004 | Mawatari | |
| 2008/0177584 A1* | 7/2008 | Altaf | ...................... G06Q 10/02 705/5 |
| 2010/0280700 A1* | 11/2010 | Morgal et al. | .................. 701/29 |
| 2011/0153629 A1* | 6/2011 | Lehmann et al. | ............ 707/758 |
| 2011/0213629 A1 | 9/2011 | Clark et al. | |

FOREIGN PATENT DOCUMENTS

| | | |
|---|---|---|
| AU | 2006100846 A4 | 11/2006 |
| EP | 2639752 A2 | 9/2013 |

\* cited by examiner

*Primary Examiner* — Akiba K Robinson
(74) *Attorney, Agent, or Firm* — Wayne Edward Ramage; Baker Donelson

(57) ABSTRACT

A system, method, apparatus and computer program product for improved vehicle late return prediction and detection. A computer system determines an end return time by which a vehicle is to be returned by a user or member to a return location. The system receives current vehicle location data at a first predetermined time before the end return time, and the distance between the current vehicle location and return location is combined with a vehicle velocity to calculate an expected return time of the vehicle. The expected return time is compared to the end return time to determine if there will be a potential late return.

8 Claims, 4 Drawing Sheets

SYSTEM FOR IMPROVED VEHICLE LATE RETURN PREDICTION AND DETECTION

CROSS REFERENCE TO RELATED APPLICATIONS

The present application claims the benefit of U.S. Provisional Patent Application No. 61/610,031, filed on Mar. 13, 2012, which is incorporated herein by reference in its entirety.

BACKGROUND

Vehicle sharing services (such as those offered by Zipcar, Inc. of Cambridge, Mass.) have become increasingly popular in the Unites States and around the world. The principles of vehicle sharing services are fairly straight forward. Individuals gain the benefits of private vehicles without the costs and responsibilities of ownership. Instead of owning one or more vehicles, a household accesses a fleet of vehicles on an as-needed basis.

In certain vehicle sharing services, the users are members and have been pre-approved to drive (e.g., background driving checks have been performed and a payment mechanism has been established). Shared vehicles are picked up and returned to a designated space. Vehicle locations are distributed throughout the service area, and often located for access by public transport. Typically, insurance and fuel costs are included in the rates.

Vehicle sharing services offer several advantages over traditional car rentals. Vehicle sharing services are not limited by office hours, and are available twenty four hours a day, seven days a week. Reservation, pickup, and return for vehicles of a vehicle sharing services is self-service. Shared vehicles can be rented by the minute, by the hour, as well as by the day.

SUMMARY

Conventional mechanisms such as those explained above suffer from a variety of deficiencies. One problem has to do with a late return of a shared vehicle. This problem affects both the current user of the vehicle and a next user of the vehicle as the late return may impact the next user. Late returns result in potential delay for the next scheduled user of the vehicle in that the next scheduled member shows up at the designated space only to find the vehicle is not there. The next scheduled user then contacts the service provider to determine how to proceed, either by reserving another vehicle in another location or making alternative plans. This results in an unsatisfactory customer experience. The service member who is returning the vehicle late is charged a late fee. It is accordingly an object of the presently described method and apparatus to eliminate or alleviate at least some of the problems referred to above.

In a particular embodiment of a method and apparatus for providing late return detection of a shared vehicle, an end time of a first reservation of a shared vehicle by a first member of a vehicle sharing service is ascertained. Then a location of the shared vehicle at a first predetermined time before the end time of the first reservation is established. Next, based on the end time of the first reservation and the location of the shared vehicle, a potential late return of the shared vehicle is determined. Finally, at least one of the first member and a representative of the vehicle sharing service are notified of the potential late return of the shared vehicle so appropriate action can be taken Other embodiments include a computer readable medium having computer readable code thereon for providing late return detection of a shared vehicle. The computer readable medium includes instructions for determining, by a computer system, an end time of a first reservation of a shared vehicle by a first member of a vehicle sharing service. The computer readable medium also includes instructions for establishing, by the computer system, a location of the shared vehicle at a first predetermined time before the end time of the first reservation. The computer readable medium further includes instructions for determining, based on the end time of the first reservation and the location of the shared vehicle, a potential late return of the shared vehicle. The computer readable medium additionally includes instructions for notifying, when a potential late return is determined, at least one of the first member of the vehicle sharing service and a representative of the vehicle sharing service of the potential late return of the shared vehicle.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides late return detection of a shared vehicle as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing late return detection of a shared vehicle as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in devices and/or software systems for such devices such as those manufactured by Zipcar Inc. of Cambridge Mass.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
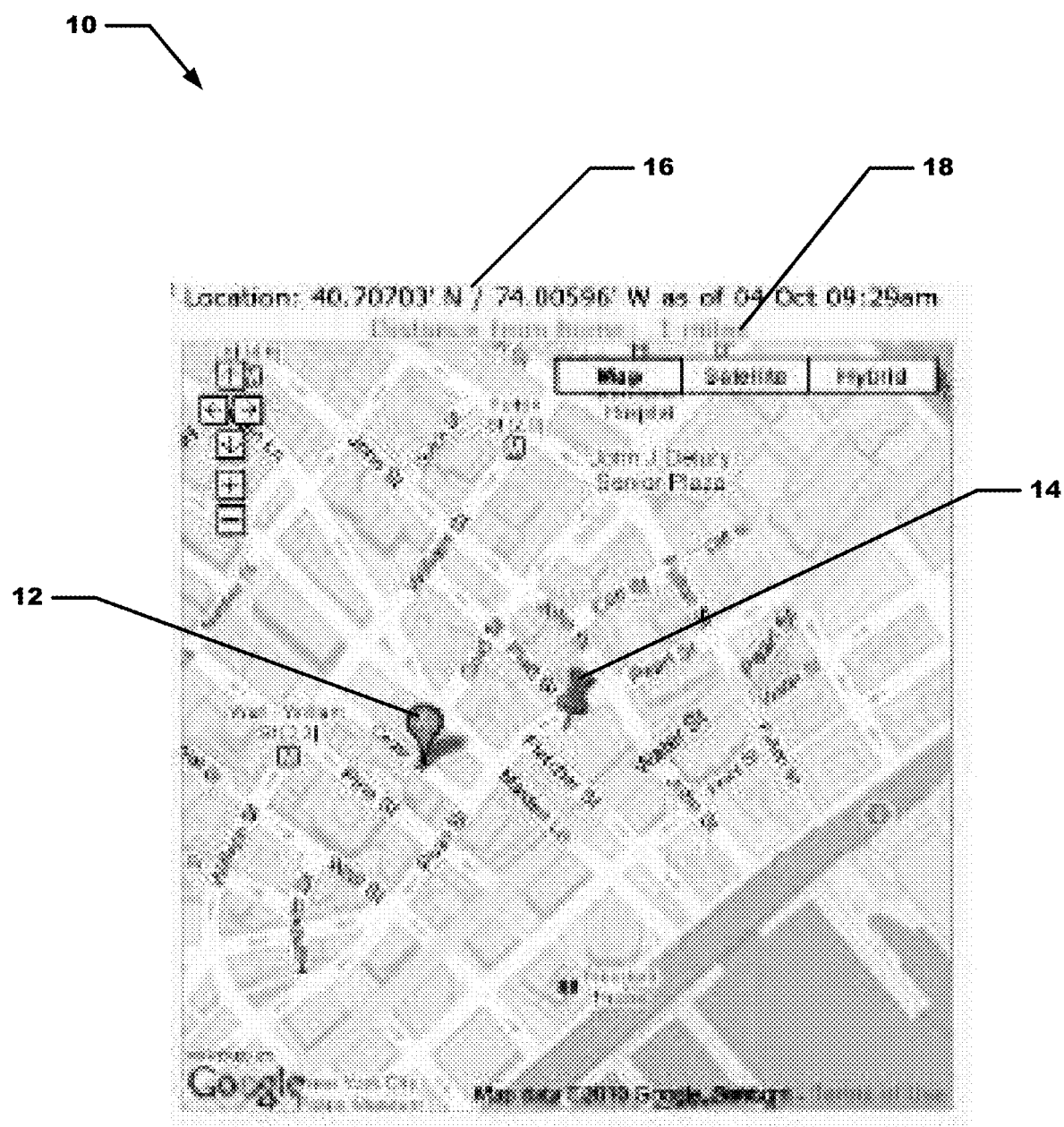
FIG. 1 comprises a screen shot of a computer system used for detecting a potential late return of a shared vehicle.

The embodiments set forth below represent the necessary information to enable those skilled in the art to practice the invention and illustrate the best mode of practicing embodiments of the invention. Upon reading the following description in light of the accompanying figures, those skilled in the art will understand the concepts of the invention and recognize applications of these concepts not particularly addressed herein. It should be understood that these concepts and applications fall within the scope of the disclosure and the accompanying claims.

The preferred embodiment of the invention will now be described with reference to the accompanying drawings. The invention may, however, be embodied in many different forms and should not be construed as limited to the embodiment set forth herein; rather, this embodiment is provided so that this disclosure will be thorough and complete, and will fully convey the scope of the invention to those skilled in the art. The terminology used in the detailed description of the particular embodiment illustrated in the accompanying drawings is not intended to be limiting of the invention. In the drawings, like numbers refer to like elements.

Vehicle sharing is a service that offers the piece-of-mind of the vehicle without the up-front costs, hassles, or environmental impacts of private vehicle ownership. Members rent vehicles on an hourly basis. In some car sharing services, members can visit a website to view the locations of cars available and reserve a vehicle for the amount of time they need. The website will also show them when the other cars are booked, allowing them to make their plans according to availability. Members can also make a reservation over the phone. When the reservation comes up, the member goes out to the car, uses an electronic card to access the car, and then drives the car as if they owned it. The card allows the service member access to the vehicle, as well as enabling the vehicle to be started. The keys are kept inside the vehicle. The service tracks the time out, time returned, and miles traveled. The car is returned to the same spot it was taken from and is then available to the next member. Typically, the cost of gas, insurance and maintenance are all included in the rental.

One problem with shared vehicles is when the vehicle is returned to its designated spot late. Late returns result in potential delay for the next scheduled user of the vehicle in that the next scheduled member shows up at the designated space only to find the vehicle is not there. The user then contacts the service provider to determine how to proceed, either by reserving another vehicle in another location or making alternative plans. This results in an unsatisfactory customer experience. The service member who is returning the vehicle late is charged a late fee.

The presently described method and apparatus for providing late return detection of a shared vehicle addresses the problem of late returns of a shared vehicle. Referring now to FIG. 1, in accordance with the present invention, a map 10 is displayed on a terminal screen. Map 10 shows the current location 10 of the shared vehicle and the home destination 14 of the shared vehicle. Map 10 also shows the last known position 16 of the vehicle (incldues longitude, latitude and time) and the calculated distance 18 from the vehicles current location 12 to the vehicles home location 14. In this instance the vehicle is only a tenth of a mile from its home location. If the vehicle were a certain distance from the home location, (for example 60 miles) and the time to travel from the current location to the home location exceeded a reasonable time for the current distance (e.g. over an hour) then a potential late return could be identified.

In a particular embodiment, the velocity of the vehicle is considered in determining whether there is a potential late arrival. The velocity can be taken as a constant (e.g., sixty miles per hour), as an approximate given the actual route traveled by the vehicle, or an actual velocity of the vehicle determined from information gathered about the shared vehicle.

Figure 2:
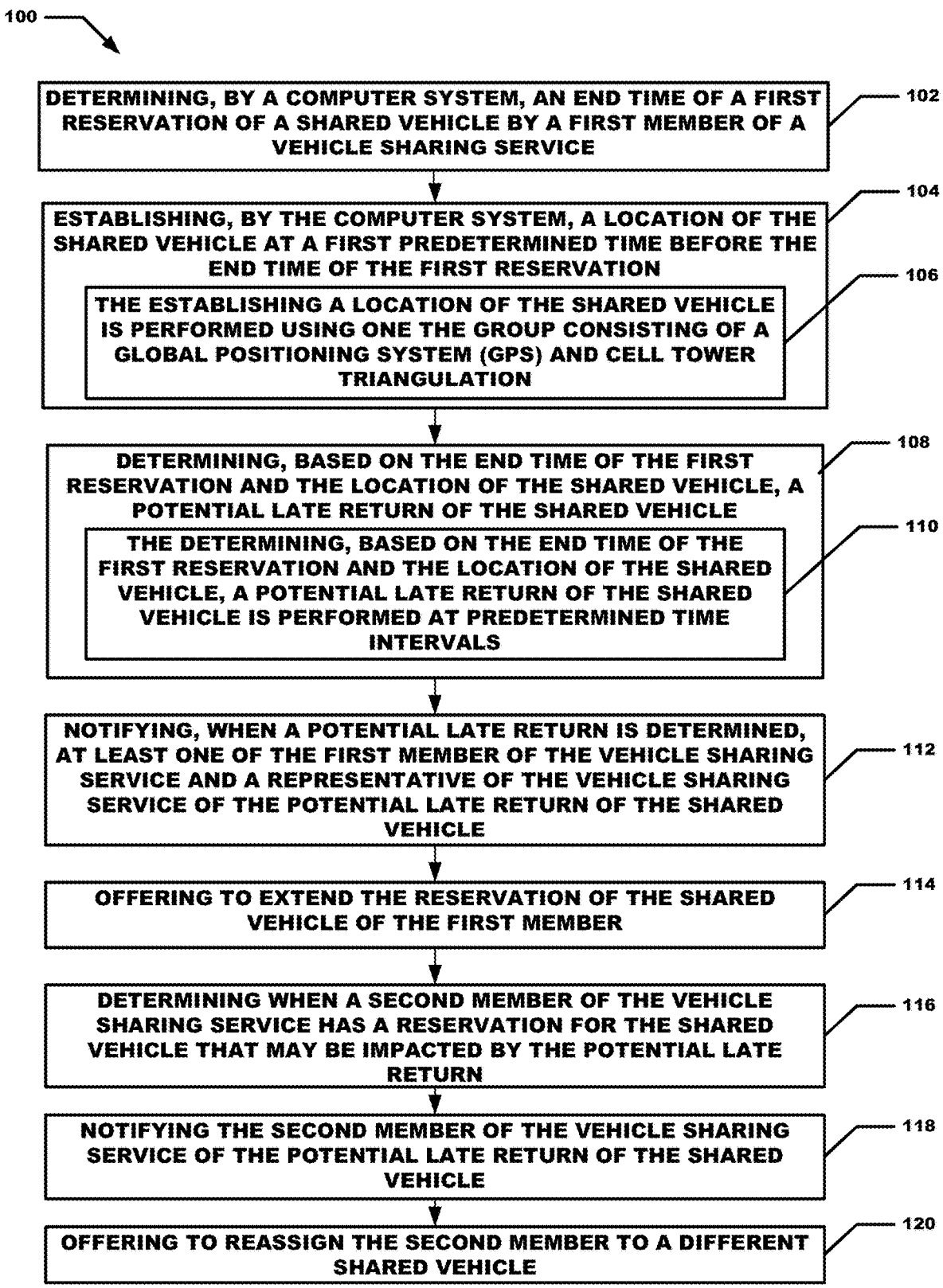
FIG. 2 comprises a high level flow diagram of a particular embodiment of a method for detecting a potential late return of a vehicle.

A flow chart of a particular embodiment of the presently disclosed method is depicted in FIG. 2. The rectangular elements are herein denoted "processing blocks" and represent computer software instructions or groups of instructions. The diamond shaped elements, are herein denoted "decision blocks," represent computer software instructions, or groups of instructions which affect the execution of the computer software instructions represented by the processing blocks. Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring to FIG. 2, the first step of a particular embodiment of the method 100 for providing late return detection of a shared vehicle is shown. Method 100 starts with processing block 102 which discloses determining, by a computer system, an end time of a first reservation of a shared vehicle by a first member of a vehicle sharing service.

Processing block 104 states establishing, by the computer system, a location of the shared vehicle at a first predetermined time before the end time of the first reservation.

Processing block 106 recites determining, based on the end time of the first reservation and the location of the shared vehicle, a potential late return of the shared vehicle. If the vehicle were a certain distance from the home location, (for example 60 miles) and the time to travel from the current location to the home location exceeded a reasonable time for the current distance (e.g. over an hour) then a potential late return is identified. Processing block 108 discloses considering a velocity associated with vehicle as par tfo the calculation. As further shown in processing block 110, the velocity used in the calculation can be a constant value, an estimates value or an actual value. Processing block 112 discloses wherein the determining, based on the end time of the first reservation and the location of the shared vehicle, a potential late return of the shared vehicle is performed at predetermined time intervals. For example, a first determination may be performed one hour before the end time of the reservation. The determining is then performed every 5 minutes thereafter.

Processing continues with processing block 114 which states notifying, when a potential late return is determined, at least one of the first member of the vehicle sharing service and a representative of the vehicle sharing service of the potential late return of the shared vehicle. The notifying can take any conventional form, including a phone call, an email, a text message or the like.

Processing block 116 recites offering to extend the reservation of the shared vehicle of the first member. Given the fact the member may be late returning the vehicle, the member can elect to extend the reservation.

Processing block 118 discloses determining when a second member of the vehicle sharing service has a reservation for the shared vehicle that may be impacted by the potential late return. In the event the vehicle is potentially returned late, this can impact later reservations for the vehicle.

Processing block 120 states notifying the second member of the vehicle sharing service of the potential late return of the shared vehicle. As shown in processing block 122, the notifying can include offering to reassign the second member to a different shared vehicle. This is done in order to try to maintain a positive experience for the second member.

Figure 3:
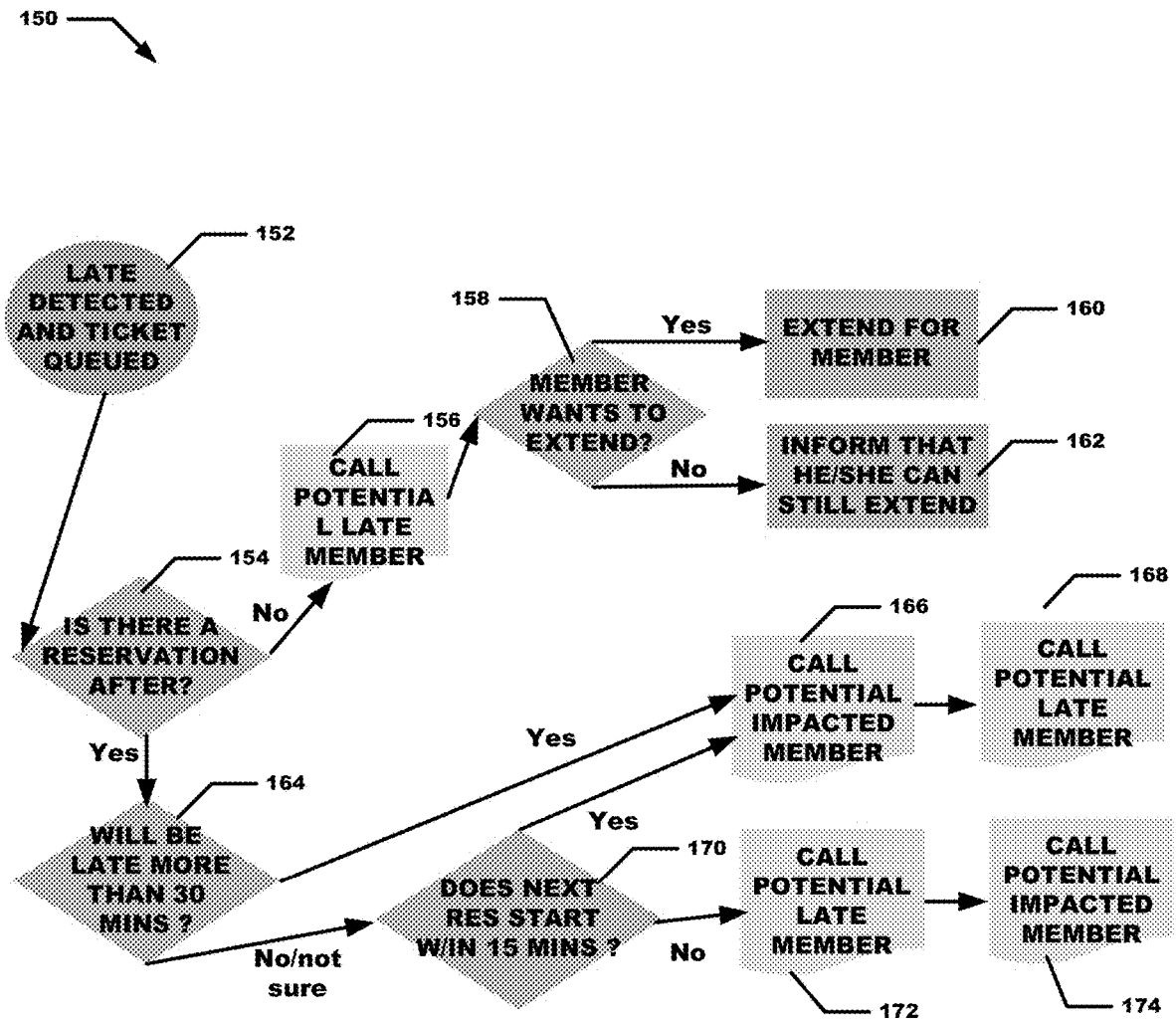
FIG. 3 comprises a high level flow diagram of a particular embodiment of a method for responding to a potential late return of a vehicle.

Referring now to FIG. 3, a high level flow diagram of the steps taken after a potential late return detection is shown. Beginning with processing block 152 which shows that upon detection of a potential late return a ticket is queued. The ticket is used to notify people within the vehicle sharing service the status so that appropriate action can be taken.

Decision block 154 recites a determination is made whether there is a reservation for the shared vehicle after the current reservation (subject to the potential late return) is set to expire. When there is not a reservation for the shared vehicle, then, as shown in processing block 156, the potential late member is contacted (phone call, email, text etc.).

At decision block 158, the member is asked if they want to extend the reservation. When the member does want to extend the reservation, processing block 160 is executed wherein the reservation is extended. When the member does not want to extend the reservation, processing block 162 is executed wherein the member is informed that they can still extend the reservation.

Referring back to decision block 154, when there is a reservation for the vehicle after the current reservation is set to expire, decision block 164 is executed. In decision block 164 a determination is made regarding whether the member will be late by more than a first predetermined amount of time (e.g., thirty minutes). When the member will be late by more than the first predetermined amount of time then, as shown in processing block 166, the potential impacted member is contacted (phone call, email, text etc.). This is done in order to schedule the impacted member for a later time or a different vehicle. Next, as shown in processing block 168, the potential late member is contacted (phone call, email, text etc.).

Referring back to decision block 164, when the member will not be late by more than the first predetermined amount of time or if the member is not sure then, as shown in decision block 170 a determination is made regarding whether the next reservation starts within a second predetermined period of time (e.g., fifteen minutes). When the next reservation for the shared vehicle is scheduled to start within the second predetermined time period, processing block 166 is executed wherein the potential impacted member is contacted (phone call, email, text etc.). This is done in order to schedule the impacted member for a later time or a different vehicle. Next, as shown in processing block 168, the potential late member is contacted (phone call, email, text etc.).

Referring back to decision block 170, when the next reservation for the shared vehicle is not scheduled to start within the second predetermined time period, processing block 172 is executed wherein the potential late member is contacted (phone call, email, text etc.). Next, as shown in processing block 174, the potential impacted member is contacted (phone call, email, text etc.).

Figure 4:
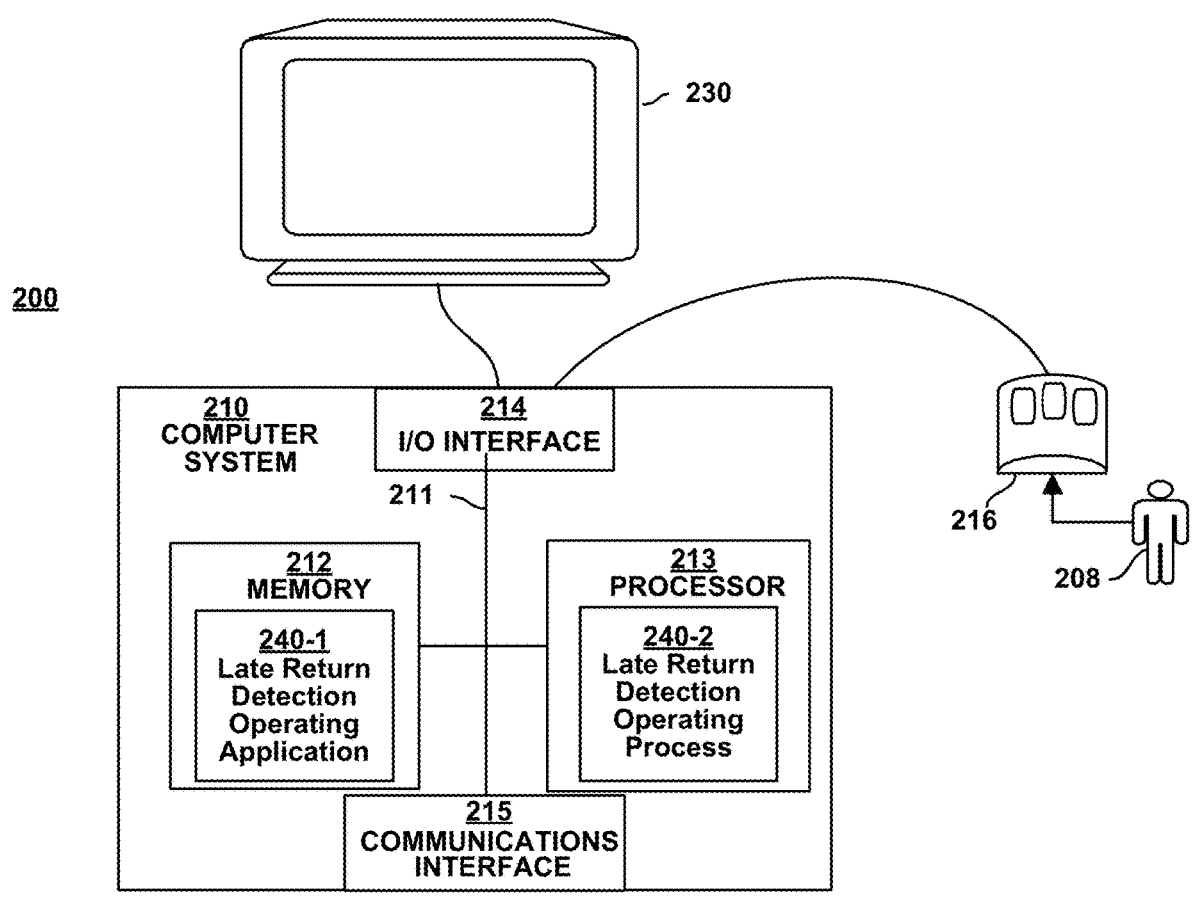
FIG. 4 illustrates an example computer system architecture for a computer system that provides late return detection f a shared vehicle in accordance with embodiments of the invention.

FIG. 4 is a block diagram illustrating example architecture of a computer system 210 that executes, runs, interprets, operates or otherwise performs a late return detection operating application 240-1 and late return detection operating process 240-2 suitable for use in explaining example configurations disclosed herein. The computer system 210 may be any type of computerized device such as a personal computer, workstation, portable computing device, console, laptop, network terminal or the like. An input device 216 (e.g., one or more customer/developer controlled devices such as a keyboard, mouse, etc.) couples to processor 213 through I/O interface 214, and enables a customer 208 to provide input commands, and generally control the graphical customer interface 260 that the late return detection operating application 240-1 and process 240-2 provides on the display 230. As shown in this example, the computer system 210 includes an interconnection mechanism 211 such as a data bus or other circuitry that couples a memory system 212, a processor 213, an input/output interface 214, and a communications interface 215. The communications interface 215 enables the computer system 210 to communicate with other devices (i.e., other computers) on a network (not shown).

The memory system 212 is any type of computer readable medium, and in this example, is encoded with a late return detection operating application 240-1 as explained herein. The late return detection operating application 240-1 may be embodied as software code such as data and/or logic instructions (e.g., code stored in the memory or on another computer readable medium such as a removable disk) that supports processing functionality according to different embodiments described herein. During operation of the computer system 210, the processor 213 accesses the memory system 212 via the interconnect 211 in order to launch, run, execute, interpret or otherwise perform the logic instructions of a late return detection operating application 240-1. Execution of a late return detection operating application 240-1 in this manner produces processing functionality in the late return detection operating process 240-2. In other words, the late return detection operating process 240-2 represents one or more portions or runtime instances of a late return detection operating application 240-1 (or the entire a late return detection operating application 240-1) performing or executing within or upon the processor 213 in the computerized device 210 at runtime.

It is noted that example configurations disclosed herein include the late return detection operating application 240-1 itself (i.e., in the form of un-executed or non-performing logic instructions and/or data). The late return detection operating application 240-1 may be stored on a computer readable medium (such as a floppy disk), hard disk, electronic, magnetic, optical, or other computer readable medium. A late return detection operating application 240-1 may also be stored in a memory system 212 such as in firmware, read only memory (ROM), or, as in this example, as executable code in, for example, Random Access Memory (RAM). In addition to these embodiments, it should also be noted that other embodiments herein include the execution of a late return detection operating application 240-1 in the processor 213 as the late return detection operating process 240-2. Those skilled in the art will understand that the computer system 210 may include other processes and/or software and hardware components, such as an operating system not shown in this example.

A display 230 need not be coupled directly to computer system 210. For example, the late return detection operating application 240-1 can be executed on a remotely accessible computerized device via the network interface 215. In this instance, the graphical customer interface 260 may be displayed locally to a customer 208 of the remote computer, and execution of the processing herein may be client-server based.

During operation, processor 213 of computer system 200 accesses memory system 212 via the interconnect 211 in order to launch, run, execute, interpret or otherwise perform the logic instructions of the late return detection application 240-1. Execution of late return detection application 240-1 produces processing functionality in late return detection process 240-2. In other words, the late return detection process 240-2 represents one or more portions of the late return detection application 240-1 (or the entire application) performing within or upon the processor 213 in the computer system 200.

It should be noted that, in addition to the late return detection process 240-2, embodiments herein include the late return detection application 240-1 itself (i.e., the un-executed or non-performing logic instructions and/or data). The late return detection application 240-1 can be stored on a computer readable medium such as a floppy disk, hard disk, or optical medium. The late return detection application 240-1 can also be stored in a memory type system such as in firmware, read only memory (ROM), or, as in this example, as executable code within the memory system 212 (e.g., within Random Access Memory or RAM).

In addition to these embodiments, it should also be noted that other embodiments herein include the execution of late return detection application 240-1 in processor 213 as the late return detection process 240-2. Those skilled in the art will understand that the computer system 200 can include other processes and/or software and hardware components, such as an operating system that controls allocation and use of hardware resources associated with the computer system 200.

The invention has been described above in detail with reference to the preferred embodiment thereof. However, as is readily understood by those skilled in the art, other embodiments are equally possible within the scope of the present invention, as defined by the appended claims.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method for providing and managing a fleet of shared vehicles, comprising the steps of:
   providing a fleet of shared vehicles, said fleet comprising a plurality of vehicles located at designated spaces in a service area, wherein each vehicle of said plurality of vehicles has a particular designated space as a home destination;
   enrolling a plurality of members in a vehicle sharing service, wherein said plurality of members have access to said fleet of shared vehicles twenty-four hours a day, seven days a week;
   accepting, using a processor in a computer server, a first reservation from a first member from said plurality of members for a first vehicle from said fleet of vehicles, wherein the first reservation includes a first reservation start time and a first reservation end return time, and further wherein said first vehicle comprises a global positioning system data communication device;
   accepting, using the processor, a second reservation from a second member from said plurality of members for said first vehicle, wherein the second reservation comprises a second reservation start time, wherein the second reservation start time is later than the first reservation end return time;
   providing, to the first member, access to the first vehicle;
   at a first predetermined time before the first reservation end return time, receiving first current vehicle location data from the global positioning system data communication device in the first vehicle;
   at said first predetermined time, receiving a first actual velocity value from the first vehicle, wherein the first actual velocity value is the actual velocity of the first vehicle at that first predetermined time;
   at said first predetermined time, calculating, using the processor, a first distance between the first current vehicle location and the home destination for the first vehicle;
   at said first predetermined time, calculating, using the processor, a first travel time for the first vehicle from the first current vehicle location to its designated space based on the first distance and the first actual velocity value;
   at said first predetermined time, determining, using the processor, an expected return time for the first vehicle to its designated space based on the first travel time and the first predetermined time;
   if the expected return time is later than the first reservation end return time, automatically notifying a representative of the vehicle sharing service of a potential late return, and queueing a potential late return ticket in the computer system for the first vehicle;
   if the expected return time is equal to or later than a first predetermined period of time after the first reservation end return time, first sending an electronic communication to the second member to notify the second member of the potential late return of the first vehicle, and extending an offer to reassign the second member to a second vehicle from said fleet of shared vehicles, then contacting the first member to offer to extend the first reservation to at least the expected return time;
   if the expected return time is earlier than the first predetermined period of time after the end time for the first period of use, then determining if the start time for the second reservation is within a second predetermined period of time of the expected return time; and
   if the start time for the second reservation is within said second predetermined period of time of the expected return time, then sending an electronic communication to the second member to notify the second member of the potential late return of the first vehicle, and extending an offer to reassign the second member to a second vehicle from said fleet of shared vehicles, then contacting the first member to offer to extend the first reservation to at least the expected return time, otherwise first contacting the first member to offer to extend the first period of time to at least the expected return time, then notifying the second member of the potential late return of the first shared vehicle, and extending an offer to reassign the second member to a second vehicle or reschedule the second member's user of the first vehicle.

2. The method of claim 1, further comprising the steps of:
   at a subsequent predetermined time after the first predetermined time, receiving subsequent current vehicle location data from the global positioning system data communication device in the first vehicle;
   at said subsequent predetermined time, receiving a subsequent actual velocity value from the first vehicle;

calculating, using the processor, a subsequent distance between the subsequent current vehicle location and the home destination for the first vehicle;

calculating, using the processor, a subsequent travel time for the first vehicle from the subsequent current vehicle location to the home destination based on the subsequent distance and the subsequent actual velocity value;

determining, using the processor, an updated expected return time for the first vehicle to the home destination based on the subsequent travel time and the subsequent predetermined time;

if the updated expected return time is later than the first reservation end return time, sending an electronic communication to the first member offering to extend the first end return time; and if the expected return time is equal to or later than the second reservation start time, sending an electronic communication to the second member to notify the second member of the potential late return of the first vehicle, and extend an offer to reassign the second member to a second vehicle from said fleet of shared vehicles.

3. A system for providing and managing a fleet of shared vehicles, comprising:

a fleet of shared vehicles, said fleet comprising a plurality of vehicles located at designated spaces in a service area, wherein each vehicle of said plurality of vehicles has a particular designated space as a home destination; and at least one computer server configured with a processor coupled to a memory and a non-transitory computer readable storage medium, wherein said processor is programmed to:

enroll a plurality of members in vehicle sharing service, wherein said plurality of members have access to said fleet of shared vehicles twenty-four hours a day, seven days a week;

accept a first reservation from a first member from said plurality of members for a first vehicle from said fleet of vehicles, wherein the first reservation includes a first reservation start time and a first reservation end return time, and further wherein said first vehicle comprises a global positioning system data communication device;

accept a second reservation from a second member from said plurality of members for a first vehicle from said fleet of vehicles, wherein the second reservation includes a second reservation start time;

provide, to the first member, access to the first vehicle;

at a first predetermined time before the first reservation end return time, receive first current vehicle location data information for said first vehicle from the global positioning system data communications device in said first vehicle;

at said first predetermined time, receive a first actual velocity value from the first vehicle, wherein the first actual velocity value is the actual velocity of the first vehicle at that first predetermined time;

calculate a first distance between the first current vehicle location for said first vehicle and the home destination for the first vehicle;

calculate a first travel time from the first current vehicle location of the first vehicle to the home destination location based on the first distance and the first actual velocity value;

determine an expected return time for said first vehicle to said home destination based on the first travel time and the first predetermined time;

determine a potential late return status for said first vehicle if the expected return time is later than the first reservation end return time;

if a potential late return status is determined, automatically sending an electronic communication to a representative of the vehicle sharing service of a potential late return, and queueing a potential late return ticket in the computer system for the first vehicle;

if the expected return time is equal to or later than a first predetermined period of time after the first reservation end return time, first, sending an electronic communication to the second member to notify the second member of the potential late return of the first vehicle, and extending an offer to reassign the second member to a second vehicle from said fleet of shared vehicles, then contacting the first member to offer to extend the first reservation to at least the expected return time;

if the expected return time is earlier than the first predetermined period of time after the end time for the first period of use, then determining if the start time for the second reservation is within a second predetermined period of time of the expected return time; and if the start time for the second reservation is within said second predetermined period of time of the expected return time, then sending an electronic communication to the second member to notify the second member of the potential late return of the first vehicle, and extending an offer to reassign the second member to a second vehicle from said fleet of shared vehicles, then contacting the first member to offer to extend the first reservation to at least the expected return time, otherwise first contacting the first member to offer to extend the first period of time to at least the expected return time, then notifying the second member of the potential late return of the first shared vehicle, and extending an offer to reassign the second member to a second vehicle or reschedule the second member's user of the first vehicle.

4. The method of claim 2, wherein the steps of claim 2 are repeated for a series of predetermined time intervals.

5. The method of claim 4, wherein the time intervals are five minutes.

6. The method of claim 1, wherein the first predetermined time is one hour.

7. The method of claim 1, wherein the potential late return status for said vehicle is determined if the expected return time is later than the first reservation end return time by more than a pre-established time period.

8. A vehicle sharing system, comprising:

a fleet of shared vehicles available for use by members of a vehicle sharing service, said shared vehicles configured with a global positioning system data communications devices, wherein a particular shared vehicle in said fleet is accessed at and returned to a designated space;

a computer system comprising a memory, a process, and a communications interface;

wherein the processor is programmed to:

receive and store first reservation information for a first period of time with a start time and an end time for a first shared vehicle in said fleet for a first member of the vehicle sharing service;

receive and store second reservation information for a second period of time with a start time and an end time for said first shared vehicle for a second member of the vehicle sharing service, wherein the second period of time is later than the first period of time;

during the first period of time, receive location data and actual velocity data from said first shared vehicle, wherein the actual velocity data is the actual velocity of the first vehicle at a particular time;

determine one hour prior to the end time for the first period of time, based upon the shared vehicle location data and the actual velocity of the first vehicle at the one hour time, the estimated return time for the shared vehicle to be returned to its designated space;

if the estimated return time is later than the end time for the first period of time, automatically notify a representative of the vehicle sharing service of a potential late return, and queue a potential late return ticket in the computer system for the first shared vehicle;

if the estimated return time is equal to or later than a first predetermined period of time after the end time for the first period of use, first notify the second member of the potential late return of the first shared vehicle, and extend an offer to reassign the second member to a second shared vehicle or reschedule the second member's user of the first shared vehicle, then contact the first member to offer to extend the first period of time to at least the estimated return time;

if the estimated return time is earlier than the first predetermined period of time after the end time for the first period of use, then determine if the start time for the second reservation is within a second predetermined period of time of the estimated return time; and if the start time for the second reservation is within said second predetermined period of time of the estimated return time, then first notify the second member of the potential late return of the first shared vehicle, and extend an offer to reassign the second member to a second shared vehicle or reschedule the second member's user of the first shared vehicle, then contact the first member to offer to extend the first period of time to at least the estimated return time, otherwise first contact the first member to offer to extend the first period of time to at least the estimated return time, then notify the second member of the potential late return of the first shared vehicle, and extend an offer to reassign the second member to a second shared vehicle or reschedule the second member's user of the first shared vehicle.

* * * * *